United States Patent
Kroll et al.

(10) Patent No.: US 9,799,860 B2
(45) Date of Patent: Oct. 24, 2017

(54) FEED-THROUGH (71) Applicant: Schott AG, Mainz (DE)

(72) Inventors: Frank Kroll, Landshut (DE); Helmut Hartl, Vienna (AT); Andreas Roters, Mainz (DE); Hauke Esemann, Woerrstadt (DE); Dieter Goedeke, Bad Soden (DE); Ulf Dahlmann, Gau-Odernheim (DE); Sabine Pichler-Wilhelm, Landshut (DE); Martin Landendinger, Rottenburg (DE); Linda Johanna Backnaes, Landshut (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 15/381,739

(22) Filed: Dec. 16, 2016

(65) Prior Publication Data
US 2017/0098803 A1    Apr. 6, 2017

Related U.S. Application Data (63) Continuation of application No. 13/966,878, filed on Aug. 14, 2013, now Pat. No. 9,539,665, which is a (Continued)

(30) Foreign Application Priority Data

Feb. 18, 2011 (DE) .......................... 10 2011 011 705
Feb. 25, 2011 (DE) .......................... 10 2011 012 430
(Continued)

(51) Int. Cl.
*H01M 2/02* (2006.01)
*H01M 2/06* (2006.01)
(Continued)

(52) U.S. Cl.
CPC ............... *H01M 2/065* (2013.01); *B23K 1/19* (2013.01); *C03C 3/19* (2013.01); *C03C 4/20* (2013.01);
(Continued)

(58) Field of Classification Search
CPC ...... B23K 15/0093; B23K 26/32; B23K 1/19; B23K 2201/36; B23K 2203/10;
(Continued)

(56) References Cited

U.S. PATENT DOCUMENTS 961,672 A    6/1910  Barnhurst
3,005,865 A  10/1961 Jonsson
(Continued)

FOREIGN PATENT DOCUMENTS

DE    690 23 071 T2    6/1996
DE    101 05 877 A1    8/2001
(Continued)

OTHER PUBLICATIONS

"Handbook of Batteries", published by David Linden, 2nd issue, McGrawhill, 1995, Chapters 36 & 39 (88 pages).
(Continued)

*Primary Examiner* — Patrick Ryan
*Assistant Examiner* — Ben Lewis
(74) *Attorney, Agent, or Firm* — Taylor IP, P.C.

(57) ABSTRACT

A feed-through, for example a battery feed-through for a lithium-ion battery or a lithium ion accumulator, has at least one base body which has at least one opening through which at least one conductor, for example a pin-shaped conductor, embedded in a glass material is guided. The base body contains a low melting material, for example a light metal, such as aluminum, magnesium, AlSiC, an aluminum alloy, a magnesium alloy, titanium, titanium alloy or steel, in particular special steel, stainless steel or tool steel. The glass
(Continued)

material consists of the following in mole percent: 35-50% $P_2O_5$; 0-14% $Al_2O_3$; 2-10% $B_2O_3$; 0-30% $Na_2O$; 0-20% $M_2O$, with M being K, Cs or Rb; 0-35% $Li_2O$; 0-20% BaO; and 0-10% $Bi_2O_3$, the glass material being free of lead except for contaminants.

54 Claims, 1 Drawing Sheet

Related U.S. Application Data continuation of application No. PCT/EP2012/000699, filed on Feb. 17, 2012.

(30) Foreign Application Priority Data

| | | | |
|---|---|---|---|
| Apr. 1, 2011 | (DE) | ......................... | 10 2011 015 869 |
| Jun. 10, 2011 | (DE) | ......................... | 10 2011 103 975 |
| Jun. 10, 2011 | (DE) | ......................... | 10 2011 103 976 |
| Jul. 7, 2011 | (DE) | ......................... | 10 2011 106 873 |

(51) Int. Cl.
| | |
|---|---|
| *H01M 10/0525* | (2010.01) |
| *H01M 10/0569* | (2010.01) |
| *H01M 2/08* | (2006.01) |
| *C03C 3/19* | (2006.01) |
| *C03C 4/20* | (2006.01) |
| *C03C 8/24* | (2006.01) |
| *C03C 29/00* | (2006.01) |
| *C03C 27/02* | (2006.01) |
| *B23K 1/19* | (2006.01) |
| *B23K 103/10* | (2006.01) |
| *B23K 101/36* | (2006.01) |

(52) U.S. Cl.
CPC ................ *C03C 8/24* (2013.01); *C03C 27/02* (2013.01); *C03C 29/00* (2013.01); *H01M 2/08* (2013.01); *H01M 10/0525* (2013.01); *H01M 10/0569* (2013.01); *B23K 2201/36* (2013.01); *B23K 2203/10* (2013.01); *C03C 2204/00* (2013.01); *C03C 2207/08* (2013.01); *H01M 2220/20* (2013.01); *H01M 2300/0037* (2013.01)

(58) Field of Classification Search
CPC .......... C03C 27/02; C03C 29/00; C03C 3/19; C03C 4/20; C03C 8/00; C03C 8/24; C03C 2204/00; C03C 2207/08; H01M 10/0525; H01M 2/06; H01M 2/065; H01M 2/24; H01M 2/305; H01M 10/0569; H01M 2220/20; H01M 2300/0037; H01M 2/08; Y02E 60/122; Y10T 29/49108; Y10T 29/4911; Y10T 29/49115

See application file for complete search history.

(56) References Cited

U.S. PATENT DOCUMENTS

| | | | |
|---|---|---|---|
| 4,122,243 A | 10/1978 | Tsuchida et al. | |
| 4,212,930 A | 7/1980 | Athearn | |
| 5,262,364 A | 11/1993 | Brow et al. | |
| 5,773,959 A | 6/1998 | Merritt et al. | |
| 5,849,434 A | 12/1998 | Miura et al. | |
| 5,853,914 A | 12/1998 | Kawakami | |
| 5,874,185 A | 2/1999 | Wang et al. | |
| 5,900,183 A | 5/1999 | Kronfli et al. | |
| 5,952,126 A | 9/1999 | Lee et al. | |
| 5,965,469 A | 10/1999 | Kilgo et al. | |
| 5,994,975 A | 11/1999 | Allen et al. | |
| 6,037,539 A | 3/2000 | Kilgo et al. | |
| 6,057,062 A | 5/2000 | Gan et al. | |
| 6,159,630 A | 12/2000 | Wyser | |
| 6,344,292 B1* | 2/2002 | Nemoto | H01M 2/1241 429/53 |
| 6,475,669 B2 | 11/2002 | Probst et al. | |
| 7,294,430 B2 | 11/2007 | Wyser | |
| 7,335,443 B2 | 2/2008 | Magneron | |
| 8,293,059 B2 | 10/2012 | Hoppe et al. | |
| 2003/0077517 A1* | 4/2003 | Nakanishi | H01M 4/131 429/324 |
| 2003/0134194 A1* | 7/2003 | Lasater | C03C 8/24 429/181 |
| 2006/0133980 A1* | 6/2006 | Nanba | H01M 4/133 423/445 R |
| 2008/0224102 A1* | 9/2008 | Lee | H01B 1/22 252/514 |
| 2009/0297861 A1* | 12/2009 | Banks | C03B 19/06 428/428 |

FOREIGN PATENT DOCUMENTS

| | | |
|---|---|---|
| DE | 10 2009 011 182 A1 | 9/2010 |
| DE | 10 2011 012 430 A1 | 8/2012 |
| EP | 0 035 074 A2 | 9/1981 |
| FR | 2 585 185 A1 | 1/1987 |
| SU | 1058909 A | 12/1983 |
| WO | 2012/110244 A1 | 8/2012 |

OTHER PUBLICATIONS

R. Gorke, K.J. Leers: Keram.Z.48 (1996), "Automatisierung eines Erhitzungsmikroskops mit Hilfe digitaler Bildverarbeitung", pp. 300-305 (6 pages).

"Schott Guide to Glass", second edition, 1996, Chapman & Hall, Chapter 2 (11 pages).

International Search Report dated Jun. 22, 2012 for International Application No. PCT/EP2012/000699 (4 pages).

DIN 51730, Testing of solid fuels—Determination of fusibility of fuel ash, Sep. 2007 (16 pages).

ISO 540, Hard coal and coke—Determination of ash fusibility, International Standard, Fourth edition, Jun. 1, 2008 (20 pages).

DIN CEN/TR 15404, Solid recovered fuels—Methods for the determination of ash melting behaviour by using characteristic temperatures, Nov. 2010 (19 pages).

DIN CEN/TS 15370-1, Solid biofuels—Method for the determination of ash melting behaviour—Part 1: Characteristic termperatures method, Dec. 2006 (12 pages).

Notification Concerning Transmittal of International Preliminary Report on Patentability and Written Decision of the International Searching Authority dated Aug. 29, 2013 for International Application No. PCT/EP2012/000699 (6 pages).

\* cited by examiner

FEED-THROUGH

CROSS REFERENCE TO RELATED APPLICATIONS

This is a continuation of U.S. patent application Ser. No. 13/966,878, entitled "FEED-THROUGH," filed Aug. 14, 2013, which is a continuation of PCT application No. PCT/EP2012/000699, entitled "FEED-THROUGH", filed Feb. 17, 2012, both of which are incorporated herein by reference.

BACKGROUND OF THE INVENTION

1. Field of the Invention

The present invention relates to a feed-through, in particular a battery feed-through, in particular for a lithium-ion battery, for example a lithium ion accumulator, a storage device, such as a battery, for example a lithium-ion battery, as well as utilization of a glass composition for feed-through of a metallic conductor into the housing of a battery, such as a lithium-ion battery.

2. Description of the Related Art

Integration of conductors, in particular in the form of metal pins into a base body which consist of a light metal such as aluminum, has hitherto not been possible with battery feed-throughs.

Feed-throughs featuring thermally greatly expanding materials such as aluminum, aluminum alloys, copper and copper alloys have become known only in the field of high frequency feed-throughs (HF-feed-through). Such HF-feed throughs and glass materials on the basis of aluminum-phosphate glasses are, for example, known from U.S. Pat. Nos. 5,262,364; 5,965,469; as well as 6,037,539.

In particular U.S. Pat. No. 6,037,539 describes an HF-feed-through whereby a ferrous or respectively a non-ferrous conductor in an aluminum-phosphate glass composition is inserted through a housing component comprising aluminum. The HF-feed through known from U.S. Pat. No. 6,037,539 is substantially optimized for its purpose of application. Frequencies of between 8 and 1000 megahertz (MHz) are preferably transferred with feed-throughs of this type. The high voltage application is also described in U.S. Pat. No. 6,037,539. However, battery feed-throughs are not described in U.S. Pat. No. 6,037,539.

Lithium-ion batteries have been known for many years. In this regard we refer you to the "Handbook of Batteries, published by David Linden, 2nd issue, McGrawhill, 1995, chapter 36 and 39".

Various aspects of lithium-ion accumulators are described in a multitude of patents, for example: U.S. Pat. Nos. 961,672; 5,952,126; 5,900,183; 5,874,185; 5,849,434; 5,853,914; and 5,773,959.

In particular in the use of batteries, for example lithium-ion accumulators in the automobile industry, a multitude of problems such as corrosion resistance, stability in accidents or vibration resistance must be solved. An additional problem is the hermetic seal of the battery, in particular the lithium-ion battery over an extended period of time. The hermetic seal may, for example, malfunction due to leakage in the area of the electrodes of the battery or respectively the electrode feed-through of the battery, a battery short-circuit or temperature changes, thus leading to a reduced life span of the battery. An additional problem with battery feed-throughs is the instability with respect to the aggressive battery electrolytes, especially with respect to non-aqueous electrolytes as are used, for example, in lithium-ion accumulators.

In order to ensure better stability in accidents, a housing for a lithium-ion battery is suggested for example in DE 101 05 877 A1, whereby the housing includes a metal jacket which is open on both sides and which is being sealed. The power connection is insulated by a synthetic material. A disadvantage of synthetic material insulations is the limited temperature resistance, the uncertain hermetic seal over the service life and the low chemical resistance with respect to the battery electrolytes.

What is needed in the art is a feed-through, in particular a battery feed-through, which avoids the problems of the current state of the art.

SUMMARY OF THE INVENTION

The present invention provides a feed-through, for example a battery feed-through, a storage device and a method of the use thereof.

A battery according to the present invention is to be understood to be a disposable battery which is disposed of and/or recycled after its discharge, as well as an accumulator. Exemplary materials discussed for lithium-ion accumulators are also light metal, in particular aluminum, an aluminum alloy or aluminum silicon carbide (AlSiC). Lithium-ion accumulators are provided for various applications, for example for portable electronic equipment, cell phones, power tools and in particular electric vehicles. The batteries can replace traditional energy sources, for example lead-acid batteries, nickel-cadmium batteries or nickel-metal hydride batteries.

According to a first aspect of the present invention a feed-through, for example a battery feed-through for a lithium-ion battery, such as for a lithium-ion accumulator is cited, having a base body whereby the base body has at least one opening through which a conductor, in particular a substantially pin-shaped conductor embedded in a glass material is guided, whereby the base body contains a material which has a low melting point, in particular a light metal, for example aluminum or AlSiC, aluminum alloys, magnesium or magnesium alloys. Also conceivable and covered by the invention are base bodies of titanium and/or titanium alloys such as Ti 6246 and/or Ti 6242. Titanium is a material which is well tolerated by the body, so that it is used for medical applications, for example in prosthetics. Due to its strength, resistance and low weight its use is also favored in special applications, for example in racing sports, but also in aviation and aerospace applications.

Additional materials for the base body and/or the battery housing are metals, especially steel, stainless steel, high-grade steel or tool steel which is intended for a later heat treatment. Suitable for use as high-grade steels are, for example, X12CrMoS17, X5CrNi1810, XCrNiS189, X2CrNi1911, X12CrNi177, X5CrNiMo17-12-2, X6CrNiMoTi17-12-2, X6CrNiTi1810 and X15CrNiSi25-20, X10CrNi1808, X2CrNiMo17-12-2, X6CrNiMoTi17-12-2. In order to be able to provide an especially effective weldability during laser welding as well as during resistance welding, high-grade steels, in particular Cr—Ni-steels having material grade numbers according to Euro-Norm (EN) 1.4301, 1.4302, 1.4303, 1.4304, 1.4305, 1.4306, 1.4307 are used as materials for the base body and/or the housing component, in particular the battery cell housing. St35, St37 or St38 can be used as standard steel.

According to the present invention, the glass material through which the conductor is guided, includes at least the following components in mol-%:

| | |
|---|---|
| $P_2O_5$ | 35-50 mol-%, for example 39-48 mol-%; |
| $Al_2O_3$ | 0-14 mol-%, for example 2-12 mol-%; |
| $B_2O_3$ | 2-10 mol-%, for example 4-8 mol-%; |
| $Na_2O$ | 0-30 mol-%, for example 0-20 mol-%; |
| $M_2O$ | 0-20 mol-%, for example 12-20 mol-%, whereby M = K, can be Cs, Rb; |
| PbO | 0-10 mol-%, for example 0-9 mol-%; |
| $Li_2O$ | 0-45 mol-%, for example 0-40 mol-%, or 17-40 mol-%; |
| BaO | 0-20 mol-%, for example 0-20 mol-%, or 5-20 mol-%; and |
| $Bi_2O_3$ | 0-10 mol-%, for example 1-5 mol-%, or 2-5 mol-%. |

Further, the glass material feed-through may have a composition which includes the following components:

| | |
|---|---|
| $P_2O_5$ | 38-50 mol-%, for example 39-48 mol-%; |
| $Al_2O_3$ | 3-14 mol-%, for example 4-12 mol-%; |
| $B_2O_3$ | 4-10 mol-%, for example 5-8 mol-%; |
| $Na_2O$ | 10-30 mol-%, for example 14-20 mol-%; |
| $K_2O$ | 10-20 mol-%, for example 12-19 mol-%; and |
| PbO | 0-10 mol-%, for example 0-9 mol-%. |

The listed inventive glass compositions are generally stable phosphate glasses which have a lower overall alkaline content than alkali-phosphate glasses known from the current state of the art.

Surprisingly, it has been shown that the inventive glass composition with a lithium-share (Li-share) of up to 45 mol-%, for example 35 mol-% are crystallization-stable, meaning they do no display detrimental crystallization during a subsequent sintering process. It is further noted that a glass composition having up to 35 mol-% $Li_2O$ does not show significant crystallization.

Because of the generally high crystallization-stability of the phosphate glasses it is ensured that melting of the glasses is generally not hampered even at temperatures of <600° C. This allows for most of the listed glass compositions to be used as glass solder or fusible glass for use with temperature sensitive materials and/or components, since melting of the glass compositions is generally not hampered even at temperatures of <600° C.

The listed glass compositions distinguish themselves in that the glass materials have a very high thermal expansion α in the range of 20° C. to 300° C., which are in the range of >14×10$^{-6}$/K, for example >15×10$^{-6}$/K, or in the range of 15×10$^{-6}$/K to 25×10$^{-6}$/K and, therefore, in the range of the thermal expansion of light metals such as aluminum but also of metals commonly used for the conductors which are guided through the glass material, namely copper. Aluminum at room temperature has a thermal expansion α of 23×10$^{-6}$/K and copper of 16.5×10$^{-6}$/K.

In order to avoid that the light metal of the base body and possibly also of the metal pin melts and deforms during sealing, the sealing temperature for fusing of the glass material with the material of the base body and/or the conductor is below the melting temperature of the material of the base body or conductor. The sealing temperature of the cited glass composition is in the range of 350° C. to 650° C. The sealing temperature may, for example, be determined through the hemispherical temperature as described in R. Görke, K. J. Leers: Keram Z. 48 (1996) 300-305, or according to DIN 51730, ISO 540 or CEN/TS 15404 and 15370-1 whose disclosure content is incorporated in its entirety herein. The measurement of the hemispherical temperature is described in detail in DE 10 2009 011 182 A1 whose disclosure content is incorporated in its entirety herein. According to DE 10 2009 011 182A1, the hemispherical temperature can be determined in a microscopic process by using a heating stage microscope. It identifies the temperature at which an originally cylindrical test body is melted into a hemispherical mass. A viscosity of approximately log η=4.6 decipascal second (dPas) can be allocated to the hemispherical temperature, as can be learned from appropriate technical literature. If a crystallization-free glass, for example in the form of a glass powder, is melted and then cooled so that it solidifies, it can then normally be melted down again at the same melting temperature. For a bonded connection with a crystallization-free glass this means that the operating temperature to which the bonded connection is continuously subjected may not be higher than the sealing temperature. Glass compositions as utilized in the current application are generally often produced from a glass powder which is melted down and which, under the influence of heat provides the bonded connection with the components which are to be joined. Generally, the sealing temperature or melting temperature is consistent with the level of the so-called hemispherical temperature of the glass. Glasses having low sealing temperatures or respectively melting temperatures are also referred to as solder glass. Instead of sealing or melting temperature, one speaks of solder temperature or soldering temperature in this instance. The sealing temperature or respectively the solder temperature may deviate from the hemispherical temperature by plus or minus 20K.

Sealing the conductor into the opening can then be accomplished as follows: First, the glass material is inserted into the opening in the base body, together with the pin shaped conductor. Then, the glass together with the conductor, for example a pin shaped conductor, is heated to the sealing temperature or respectively the hemispherical temperature of the glass, so that the glass material softens and envelops the conductor, in particular the pin shaped conductor in the opening and fits closely against the base body. Since the melting temperature of the material of the base body as well as of the conductor, in particular the pin shaped conductor is higher than the sealing temperature of the glass, the base body, as well as the pin shaped conductor are in a solid state. The sealing temperature of the glass material is, for example, 20 to 150 K below the melting temperature of the material of the base body or respectively of the pin shaped conductor. If for example, the light metal used is aluminum having a melting point of $T_{MELT}$=660.32° C., then the fusing temperature or respectively solder temperature of the glass material is in the range of between approximately 350° C. to 640° C., for example in the range of 350° C. to <550° C., or in the range of 450° C. to <550° C. As an alternative to a light metal, such as for example aluminum or an aluminum alloy, a silicon carbide (SiC) matrix which is infiltrated with Aluminum (Al) could also be used as material for the base body. A material of this type is also described as AlSiC. AlSiC has a SiC core into which Al is infused. Based on the proportion of Al the properties, especially the coefficient of expansion, can be adjusted. AlSiC notably has a lower heat expansion than pure aluminum.

Other materials which can be used for the base body and/or the battery housing are, for example, magnesium or magnesium alloys. The use of titanium or titanium alloys is also conceivable for the base body. Also metals, in particular steel, stainless steel, high-grade steel or tool steel are conceivable materials.

The material of the conductor, for example the pin shaped conductor, can be identical to the material of the base body—for example aluminum, Aluminum silicon carbide (AlSiC), an aluminum alloy, magnesium or a magnesium alloy. This has the advantage that the coefficient of expansion of the base body and the metal pin is identical. The coefficient of expansion α of the glass- or glass ceramic material needs then only to be adapted to one material. Furthermore, the outer conductor may include high-grade steel or steel. In order to provide a compression seal feed-through in such a case, $\alpha_{base\ body}$ is selected different from $\alpha_{metal\ pin}$.

Alternatively, the pin shaped conductor may include copper (Cu), a copper alloy, Copper silicon carbide (CuSiC) or a nickel iron (NiFe) alloy, silver, a silver alloy, gold, a gold alloy, a copper core, that is a NiFe jacket with an interior copper part, as well as a cobalt iron alloy as materials.

As aluminum or respectively aluminum alloy for the conductor, the following may be utilized:

EN AW-1050 A;
EN AW-1350;
EN AW-2014;
EN AW-3003;
EN AW-4032;
EN AW-5019;
EN AW-5056;
EN AW-5083;
EN AW-5556;A
EN AW-6060; and
EN AW-6061.

As copper or respectively copper alloys for the conductor, the following may be utilized:

Cu-PHC 2.0070;
Cu-OF 2.0070;
Cu-ETP 2.0065;
Cu-HCP 2.0070; and
Cu-DHP 2.0090.

In the case that the base body and the metal pin are formed of different materials, $\alpha_{base\ body} \geq \alpha_{glass} \geq \alpha_{metal\ pin}$ for example applies. The different coefficient of expansions of the materials then permit compression sealing, whereby a frictional connection is established between glass material and surrounding materials.

The battery feed-through of the present invention not only distinguishes itself in that sealing, for example compression sealing into a base body having a low melting temperature is possible, but also sufficient resistance with respect to the battery electrolytes is provided. The present invention provides in particular a sufficient chemical stability in regard to non-aqueous and as a rule, aggressive battery electrolytes. Non-aqueous battery electrolytes consist typically of a carbonate, in particular a carbonate mixture, for example a mixture of ethylene-carbonate or dimethyl-carbonate, whereby the aggressive non-aqueous battery electrolytes include a conducting salt, for example conducting salt $LiPF_6$, for example in the form of a 1 molar solution. Surprisingly, the listed glass compositions have in addition to a high thermal coefficient of expansion in the range of $(20°\ C.$-$300°\ C.) > 14 \times 10^{-6}/K$, for example between $15 \times 10^{-6}/K$ and $25 \times 10^{-6}/K$, a low sealing or respectively hemispherical temperature, and a sufficient resistance to the previously mentioned solid battery electrolytes.

The glass compositions for the battery feed-through of the present invention include, for example, lithium (Li) which is built into the glass structure. Since Li is also contained in the electrolyte as used for Li-ion storage devices, battery efficiency is hereby not impaired.

Low sodium or respectively sodium-free glass compositions may also be utilized, since the diffusion of the alkali-ions occurs in Na+>K+>Cs+ sequence and since therefore low sodium or respectively sodium-free glasses are especially resistant to electrolytes, for example those which are used in Li-ion storage devices.

The resistance of the composition according to the present invention against the battery electrolytes can be verified in that the glass composition in the form of a glass powder is ground to a granularity of d50=10 micrometers (μm) and is stored in the electrolytes for a predetermined time period, for example one week. d50 means, that 50% of all particles or granules of the glass powder are smaller than or equivalent to a diameter of 10 μm. As non-aqueous electrolyte, a carbonate mixture of ethylene-carbonate and dimethyl-carbonate is used, for example, at a ratio of 1:1 with a molar $LiPF_6$ as conducting salt. After the glass powder was exposed to the electrolyte, the glass powder can be filtered off and the electrolyte be examined for glass elements which were leached from the glass. Herein it was demonstrated that with the glasses used according to the present invention such leaching in the utilized composition ranges occurs surprisingly only to a limited extent of less than 20 mass percent; and that in special instances leaching of <5 mass percent is achieved at a thermal expansion α in a temperature range of $20°\ C.$ to $300°\ C. > 14 \times 10^{-6}/K$, for example between $15 \times 10^{-6}/K$ and $25 \times 10^{-6}/K$. An additional advantage of the glass composition according to the present invention which finds use in a battery feed-through with one or several pins, for example of aluminum or an aluminum alloy can be seen in that sealing of the glass with the surrounding light metal or respectively the metal of the conductor is possible also in a gaseous atmosphere which is not an inert gas atmosphere. In contrast to the previously used method, a vacuum is also no longer necessary for Al-fusing. This type of fusing can rather occur under atmospheric conditions. For both types of sealing $N_2$ or Ar can be used as inert gas. As a pre-treatment for sealing, the metal is cleaned and/or etched, and if necessary is subjected to targeted oxidizing or coating.

During the process temperatures of between 300° C. and 600° C. are used at heating rates of 0.1 to 30 Kelvin per minute (K/min) and dwell times of 1 to 60 minutes.

The listed glass compositions surprisingly show a high chemical stability relative to the, for example, non-aqueous electrolyte and at the same time a high thermal coefficient of expansion. This is surprising especially because it is assumed that the glass becomes increasingly unstable the higher the thermal coefficient. It is therefore surprising that in spite of the high coefficient of expansion and the low sealing temperature the listed glass compositions offer a sufficient stability.

Also, with $Na_2O$ contents of to 29 mole percent (mol-%), for example to 20 mol-% very stable glasses are obtained.

The listed inventive glass compositions can be provided with fillers for the purpose of expansion adaptation that is, for adaptation of the coefficient of expansion.

In order to make the glass composition accessible for IR-heating, the aforementioned glasses can be provided with doping agents having an emission maximum in the range of infrared radiation, in particular IR-radiation of an IR-source. Examples of materials for this are Fe, Cr, Mn, Co, V, pigments. The thus prepared glass material can be heated by locally targeted infrared radiation.

The present invention provides a battery lead-through which, in contrast to lead-throughs known from the current state of the art, in particular those using synthetic material as sealing material, distinguishes itself through a high temperature resistance, in particular temperature change resistance. Moreover, a hermetic seal is also provided during temperature change, thus avoiding that liquid, in particular battery liquid can emerge and/or moisture can penetrate into the housing. It is understood that with a hermetic seal the helium leakage rate is <1×10$^{-8}$ milibar liters per second (mbar 1 s$^{-1}$), for example <1·10$^{-9}$ mbar 1 s$^{-1}$.

The battery feed-through moreover provides sufficient chemical resistance, in particular compared to non-aqueous battery electrodes.

One pre-treatment measure to which the battery feed-through can be subjected is pickling.

In addition to the feed-through and in accordance with another embodiment of the present invention, an electric storage device, for example a battery, such as a battery cell which is provided with a feed-through is provided. The housing consists, for example, of the same material as the base body, for example a light metal. For battery cells the base body may be part of the battery housing. The battery is, for example, a lithium-ion battery.

Materials for the housing or respectively the base body may also be metals such as steel, stainless steel, high-grade steel, light metals, for example titanium, titanium alloys, aluminum, aluminum alloys, magnesium or magnesium alloys without restriction thereto.

In the current application metals which have a specific weight of less than 5.0 kilograms per cubic decimeter (kg/dm$^3$) are understood to be light metals. The specific weight of the light metals is, for example, in the range of 1.0 kg/dm$^3$ to 3.0 kg/dm$^3$.

If the light metals are additionally used as materials for the conductors, for example for the pin shaped conductor or the electrode connection component, then the light metals further distinguish themselves through an electric conductivity in the range of 5×10$^6$ Siemens per meter (S·m$^{-1}$) to 50×10$^{-6}$ S·m$^{-1}$.

When used in compression seal feed-throughs the coefficient of expansion α of the light metal for the range of 20° C. to 300° C. is moreover in the range of 10×10$^{-6}$/K to 30×10$^{-6}$/K.

Light metals generally have a melting temperature in the range of 350° C. to 800° C.

The battery may have a non-aqueous electrolyte, for example a carbonate basis, such as a carbonate mixture. The carbonate mixture can include an ethylene-carbonate in a mixture with dimethyl-carbonate with a conducting salt, for example LiPF$_6$.

According to a third embodiment of the present invention, a glass material including the following components in mol-% is provided for insertion of a metallic conductor into the housing of a storage device:

| | |
|---|---|
| P$_2$O$_5$ | 35-50 mol-%, for example 39-48 mol-%; |
| Al$_2$O$_3$ | 0-14 mol-%, for example 2-12 mol-%; |
| B$_2$O$_3$ | 2-10 mol-%, for example 4-8 mol-%; |
| Na$_2$O | 0-30 mol-%, for example 0-20 mol-%; |
| M$_2$O | 0-20 mol-%, for example 12-20 mol-%, whereby M = K can be Cs, Rb; |
| PbO | 0-10 mol-%, for example 0-9 mol-%; |
| Li$_2$O | 0-45 mol-%, for example 0-40 mol-%, or 17-40 mol-%; |
| BaO | 0-20 mol-%, for example 5-20 mol-%, or 5-20 mol-%; and |
| Bi$_2$O$_3$ | 0-10 mol-%, for example 1-5 mol-%, or 2-5 mol-%. |

Further, a glass material according to the present invention may include including the following components in mol-%:

| | |
|---|---|
| P$_2$O$_5$ | 38-50 mol-%, for example 39-48 mol-%; |
| Al$_2$O$_3$ | 3-14 mol-%, for example 4-12 mol-%; |
| B$_2$O$_3$ | 4-10 mol-%, for example 5-8 mol-%; |
| Na$_2$O | 10-30 mol-%, for example 14-20 mol-%; |
| K$_2$O | 10-20 mol-%, for example 12-19 mol-%; and |
| PbO | 0-10 mol-%, for example 0-9 mol-%, | for insertion of a metallic conductor into the housing of a storage device, for example a battery, such as a lithium-ion battery. In one embodiment of the present invention, the metallic conductor of the storage device is a light metal, which can include aluminum, an aluminum alloy, copper or a copper alloy. The base body as well as the housing may also consist of light metal, for example aluminum or an aluminum alloy.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawing, wherein.

Figure 1:
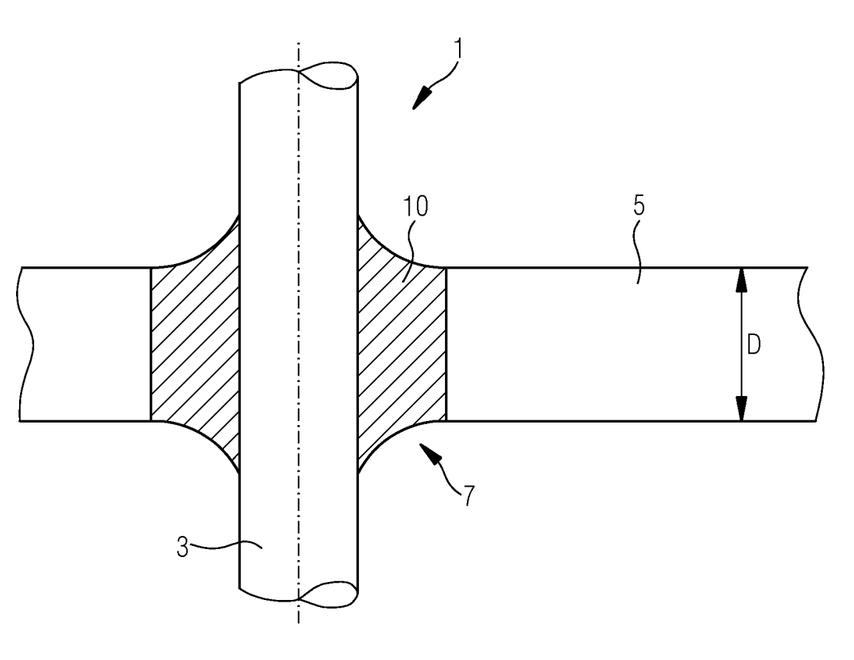
The FIGURE illustrates a feed-through according to the present invention.

The exemplification set out herein illustrates one embodiment of the invention and such exemplification is not to be construed as limiting the scope of the invention in any manner.

DETAILED DESCRIPTION OF THE INVENTION

Referring now to the drawing, there is shown a feed-through 1 according to the present invention. Feed-through 1 includes a metal pin 3 as a conductor, for example a pin shaped conductor which consists of a material, for example aluminum, an aluminum alloy, a copper alloy or copper. Feed-through 1 further includes a base body 5 in the embodiment of a metal part consisting according to the present invention of a metal which has a low melting point, that is a light metal such as aluminum, an aluminum alloy, magnesium, a magnesium alloy, titanium or a titanium alloy. Metal pin 3 is inserted through an opening 7 which leads through base body or metal part 5. Even though only the insertion of a single metal pin through the opening is illustrated, several metal pins could be inserted through the opening, without deviating from the present invention.

The outer contour of opening 7 can be round, but also oval. Opening 7 penetrates through entire thickness D of base body 5, or respectively metal part 5. Metal pin 1 is sealed into glass material 10 and is inserted inside glass material 10 through opening 7 through base body 5. Opening 7 is introduced into base body 5 through a separation process, for example stamping. In order to provide a hermetic feed-through of metal pin 3 through opening 7, metal pin 3 is sealed into a glass plug formed of the glass material according to the present. A substantial advantage of this production method is that even under increased pressure upon the glass plug, for example a compression load, expulsion of the glass plug with metal pin from opening 7 is avoided. The sealing temperature of the glass material according to the present invention with the base body is 20K to 100K below the melting temperature of the material of base body 5 and/or of the conductor, for example the pin shaped conductor.

Table 1 below illustrates eight exemplary embodiments (AB1-AB8) for the inventive glass compositions which are compared in Table 2 with comparative glasses (VB1-VB9).

TABLE 1

|  | AB1 | AB2 | AB3 | AB4 | AB5 | AB6 | AB7 | AB8 |
|---|---|---|---|---|---|---|---|---|
| Mol-% | | | | | | | | |
| $P_2O_5$ | 47.6 | 43.3 | 43.3 | 43.3 | 37.1 | 40.0 | 42.0 | 46.5 |
| $B_2O_3$ | 7.6 | 4.8 | 4.7 | 4.8 | 4.9 | 6.0 | 6.0 | 7.6 |
| $Al_2O_3$ | 4.2 | 8.6 | 8.7 | 2.0 | 2 | 12.0 | 12.0 | 4.2 |
| $Na_2O$ | 28.3 | 17.3 | | | | 15.0 | 16.0 | 28.3 |
| $K_2O$ | 12.4 | 17.3 | 17.3 | | | 18.0 | 19.0 | 12.4 |
| PbO | | | | | | 9.0 | | |
| BaO | | 8.7 | 8.7 | 15.4 | 14 | | | |
| $Li_2O$ | | | 17.3 | 34.6 | 42.1 | | | |
| $Bi_2O_3$ | | | | | | | 5 | 1 |
| Hemisphere Temperapture (° C.) | 513 | 554 | 564 | 540 | 625 | | 553 | 502 |
| $\alpha$(20-300° C.) ($10^{-6}$/K) | 19 | 16.5 | 14.9 | 13.7 | 14.8 | 16.7 | 16.0 | 19.8 |
| Tg (° C.) | 325 | 375 | 354 | 369 | 359 | 392 | 425 | 347 |
| Density [g/cm$^3$] | 2.56 | | | | | 3 | 3.02 | 2.63 |
| Leaching In Ma-% | 18.7 | 14.11 | 7.66 | 12.63 | 1.47 | 3.7 | 29.01 | 8.43 |
| Weight-Loss (%) after 70 h in 70° C.-Water | 10.7 | 0.37 | 0.1 | 0.13 | 0.13 | n.b. | 0.006/0.001 | 0.45/0.66 |

In addition to leaching, the hydrolytic resistances of the individual glasses were also determined.

The hydrolytic resistance tests were conducted so that melted down glass samples were produced (2×2 centimeters (cm), height: ~0.5 cm) which were stored in 200 mililiters (mL) water at 25° C. (degrees Celsius) and 70° C. for 70 hours. Subsequently the material loss in weight-% was determined and listed in the table.

Exemplary embodiment 1 (AB1) in Table 1 is suitable in particular for aluminum/aluminum sealing, that is sealing an aluminum pin as conductor into a surrounding aluminum base body.

Exemplary embodiment 6 in Table 1 is, for example, suitable for Cu/Al glazing, that is sealing a copper pin in the embodiment of a conductor into a surrounding aluminum base body.

Even though some of the exemplary embodiments indicate a coefficient of expansion which is too low for bonding with Cu it becomes clear that a high Li component can be dissolved in the molten mass without the glass becoming unstable with a glass composition of this type.

Exemplary embodiments 7 and 8 (AB7 and AB8) distinguish themselves in that they contain $Bi_2O_3$, in place of PbO, as is the case in exemplary embodiment 6 (AB6).

Surprisingly it has been shown that the water resistance can be clearly increased by $Bi_2O_3$. For example, by introducing 1 mol-% $Bi_2O_3$ a 10-times higher hydrolytic resistance could be achieved in exemplary embodiment 8 (AB8) compared to exemplary embodiment 1 (AB1) with essentially the same alkali content. This is surprising to the expert.

$Bi_2O_3$, can in particular also be used in place of PbO according to exemplary embodiment 6 (AB6). Since lead is environmentally harmful, glass compositions which, except for contaminants, are free of PbO, that is where PbO can be set to 0 mol-%—are advantageous. In this application "free of, except for contaminants" means that less than 100 parts per million (ppm), for example less than 10 ppm, or less than 1 ppm of the respective components, for example lead, are contained in the glass.

Table 2 below lists conventional glass compositions (VB1-VB9) which were examined in comparison to the aforementioned inventive exemplary embodiments AB1 through AB9.

Tables 1 and 2 show the composition in mol-%, the transformation temperature Tg as defined for example in "Schott Guide to Glass, second edition, 1996, Chapman & Hall, pages 18-21, the total leaching in mass percentage (Ma-%), the coefficient of expansion $\alpha$ in $10^{-6}$/K in the range of 20° C.-300° C., as well as the density in g/cm$^3$. The total leaching is determined as described in the introductory section, meaning that the glass compositions were ground to glass powder having a d50=10 µm granularity, and were exposed for one week to the electrolyte consisting of ethylene-carbonate/dimethyl-carbonate at a ratio 1:1, with 1 molar $LiPF_6$ in the form of conducting salt dissolved therein and after this time were examined for glass components which were leached from the glass. "n.b." in Table 1 denotes unknown properties.

TABLE 2

| | Comparison examples | | | | | | | | |
|---|---|---|---|---|---|---|---|---|---|
| | VB 1 | VB 2 | VB 3 | VB 4 | VB 5 | VB 6 | VB 7 | VB 8 | VB 9 |
| System Composition [mol-%] | $SiO_2$ | $SiO_2$ | $SiO_2$ | $SiO_2$ | $P_2O_5$ | $P_2O_5$ | $P_2O_5$ | $P_2O_5$ | $P_2O_5$ |
| $SiO_2$ | 66.5 | 66.6 | 63.3 | 77.8 | | 55.4 | | 2.6 | |
| $ZrO_2$ | | | 2.4 | | | 11.8 | | | |
| $Al_2O_3$ | 9.3 | 10.4 | 1.0 | 3.3 | 8.4 | 5.5 | 12.8 | 4.0 | 7.4 |

TABLE 2-continued

| | Comparison examples | | | | | | | | |
|---|---|---|---|---|---|---|---|---|---|
| | VB 1 | VB 2 | VB 3 | VB 4 | VB 5 | VB 6 | VB 7 | VB 8 | VB 9 |
| $B_2O_3$ | 4.0 | 7.3 | 4.1 | 9.4 | | | 31.2 | 1.7 | |
| MgO | 4.0 | 4.4 | 3.3 | | 4.3 | 20.5 | | 2.9 | |
| BaO | 3.8 | 1.5 | 2.5 | 0.2 | 7.0 | | | 7.8 | |
| $La_2O_3$ | | | | | | 1.3 | | | |
| $Li_2O$ | | | 0.6 | | | | | | |
| $K_2O$ | | | 7.9 | | | 2.0 | | 2.4 | |
| $P_2O_5$ | | | | | 5.3 | 6.8 | 29.3 | 59.7 | 50.5 |
| CaO | 12.3 | 9.6 | 4.7 | 1.6 | 7.9 | | | 8.1 | |
| $Na_2O$ | | | 9.1 | 7.0 | | | | 0.5 | |
| SrO | | | | | 11.3 | | | | |
| F | | | 1.0 | 0.6 | 54.7 | | | | |
| PbO | | | | | | | | | |
| SnO | | | | | | | 27.0 | | 42.2 |
| ZnO | | | | | | | | 8.9 | |
| Tg | 720 | 716 | 508 | 562 | 464 | 680 | n.b. | 462 | n.b. |
| Total leaching in Ma.-% | 43.5 | 52.4 | 167.0 | 64.4 | 2.1 | 127.6 | 50.2 | 18.8 | 1.9 |
| α (20° C.-300° C.) | 4.6 | 3.8 | 10.4 | 4.9 | 14.8 | 5.5 | n.b. | n.b. | n.b. |
| Density [g/cm³] | 2.6 | 2.5 | n.b. | 2.3 | 3.7 | 2.8 | n.b. | 2.8 | n.b. |

The comparison examples VB1, VB2 and VB6 cited in Table 2 show a transformation temperature Tg which is too high and a thermal coefficient of expansion α which is too low compared to the compositions according to exemplary embodiments AB1-AB8. Comparison example VB3 does have a sufficiently low Tg, a better, however not sufficient coefficient of expansion α in the range of 20° C. to 300° C., and a high instability with respect to the battery electrolytes. Comparison example VB4 shows a favorable Tg, however the resistance and the coefficient of expansion α are not sufficient. Comparison example VB5 shows an excellent resistance, the Tg is satisfactory, however the coefficient of expansion α is not sufficient.

Surprisingly, exemplary embodiments AB1-AB8 according to Table 1 show a high coefficient of expansion α according to the present invention, low Tg and high chemical resistance in the inventive composition range. The inventive glass compositions thereby provide sealing glasses or respectively fusible glasses or respectively solder glasses for battery feed-throughs, having a low process temperature, a sealing temperature which is lower than the melting point of light metal, for example aluminum, a high coefficient of expansion α and an excellent resistance to battery electrolytes.

The current invention cites for the first time a feed-through for a housing, in particular for a battery housing, for example for a lithium-ion battery which can be integrated into housing components of battery cell housings consisting of a light metal, such as aluminum (Al), aluminum alloy, magnesium, magnesium alloy, titanium or titanium alloy. However, steel or high-grade steel, in particular stainless steel are also conceivable as materials for the battery cell housing. In such a case, the materials of, for example, a pin shaped conductor with head part and, if necessary, the base body are selected and adapted accordingly.

With the feed-through component according to the present invention a battery housing can be provided which is hermetically sealed even when the battery housing is deformed, in contrast to plastic feed-throughs which have a tendency toward cracking. On batteries with battery housings which are equipped with an inventive feed-through an especially high fire resistance is provided in the event of a vehicle accident. This is particularly relevant in the use of batteries, for example Li-ion batteries in automobiles.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A feed-through, comprising:
at least one base body having at least one opening;
a conductor; and
a glass material, said conductor being embedded in said glass material and inserted into said at least one opening of said at least one base body, said glass material including the following in mole percent (mol-%):

| | |
|---|---|
| $P_2O_5$ | 35-50 mol-%; |
| $Al_2O_3$ | 0-14 mol-%; |
| $B_2O_3$ | 2-10 mol-%; |
| $Na_2O$ | 0-30 mol-%; |
| $M_2O$ | 0-20 mol-%, wherein M is one of K, Cs and Rb; |
| $Li_2O$ | 0-35 mol-%; |
| BaO | 0-20 mol-%; and |
| $Bi_2O_3$ | 0-10 mol-%, | wherein said glass material is free of lead except for contaminants.

2. The feed-through according to claim 1, wherein said glass material includes:

| | |
|---|---|
| $P_2O_5$ | 39-48 mol-%; |
| $Al_2O_3$ | 2-12 mol-%; |
| $B_2O_3$ | 4-8 mol-%; |
| $Na_2O$ | 0-20 mol-%; |
| $M_2O$ | 12-20 mol-%; |
| $Li_2O$ | 0-35 mol-%; |
| BaO | 0-20 mol-%; and |
| $Bi_2O_3$ | 1-5 mol-%. |

3. The feed-through according to claim 2, wherein said glass material includes:

| | |
|---|---|
| Li₂O | 17-35 mol-%; |
| BaO | 5-20 mol-%; and |
| Bi₂O₃ | 2-5 mol-%. |

4. The feed-through according to claim 1, wherein said feed-through is a battery feed-through.

5. The feed-through according to claim 4, wherein said battery feed-through is for a lithium-ion battery.

6. The feed-through according to claim 4, wherein said battery feed-through is for a lithium ion accumulator.

7. The feed-through according to claim 1, wherein said conductor is a substantially pin-shaped conductor.

8. The feed-through according to claim 7, wherein said conductor includes one metal.

9. The feed-through according to claim 8, wherein said one metal is one of copper, copper silicon carbide (CuSiC), aluminum, aluminum silicon carbide (AlSiC), magnesium, silver, gold, aluminum alloys, silver alloys, gold alloys and nickel-iron (NiFe) alloys.

10. The feed-through according to claim 1, wherein said base body is formed from a material having a low melting temperature.

11. The feed-through according to claim 10, wherein said material having a low melting temperature is a light metal.

12. The feed-through according to claim 11, wherein said light metal is one of aluminum, magnesium, aluminum silicon carbide (AlSiC), an aluminum alloy, a magnesium alloy, titanium, a titanium alloy and steel.

13. The feed-through according to claim 12, wherein said steel is one of a high-grade steel, stainless steel and tool steel.

14. The feed-through according to claim 1, wherein said glass material includes:

| | |
|---|---|
| P₂O₅ | 38-50 mol-%; |
| Al₂O₃ | 3-14 mol-%; |
| B₂O₃ | 4-10 mol-%; |
| Na₂O | 10-30 mol-%; and |
| K₂O | 10-20 mol-%. |

15. The feed-through according to claim 14, wherein said glass material includes:

| | |
|---|---|
| P₂O₅ | 39-48 mol-%; |
| Al₂O₃ | 4-12 mol-%; |
| B₂O₃ | 4-8 mol-%; |
| Na₂O | 14-20 mol-%; and |
| K₂O | 12-19 mol-%. |

16. The feed-through according to claim 1, wherein said glass material has a coefficient of expansion α in a range of between approximately 20° C. and 300° C. of >14×10⁻⁶/K.

17. The feed-through according to claim 16, wherein said coefficient of expansion α in a range of between approximately 20° C. and 300° C. is in a range of between approximately 15×10⁻⁶/K and 25×10⁻⁶/K.

18. The feed-through according to claim 1, said glass material further comprises a plurality of additives within a range of an emission maximum of infrared radiation.

19. The feed-through according to claim 18, wherein said plurality of additives include iron (Fe), Chromium (Cr), Cobalt (Co) and Vanadium (V).

20. The feed-through according to claim 1, wherein said glass material is sealed with at least one of said base body and said conductor under a normal atmosphere.

21. The feed-through according to claim 20, wherein said base body is an aluminum base body soldered with an aluminum conductor under said normal atmosphere.

22. The feed-through according to claim 1, wherein said glass material has a high chemical resistance to non-aqueous battery electrolytes.

23. The feed-through according to claim 22, wherein said glass material has a high chemical resistance to carbonates.

24. The feed-through according to claim 23, wherein said carbonates are carbonate mixtures with a conducing salt.

25. The feed-through according to claim 24, wherein said carbonate mixtures with a conducing salt include lithium hexafluorophosphate (LiPF₆).

26. A storage device, comprising:
a feed-through including:
at least one base body having at least one opening;
a conductor; and
a glass material, said conductor being embedded in said glass material and inserted into said at least one opening of said at least one base body, said glass material including the following in mole percent (mol-%):

| | |
|---|---|
| P₂O₅ | 35-50 mol-%; |
| Al₂O₃ | 0-14 mol-%; |
| B₂O₃ | 2-10 mol-%; |
| Na₂O | 0-30 mol-%; |
| M₂O | 0-20 mol-%, wherein M is one of K, Cs and Rb; |
| Li₂O | 0-35 mol-%; |
| BaO | 0-20 mol-%; and |
| Bi₂O₃ | 0-10 mol-%, | wherein said glass material is free of lead except for contaminants.

27. The storage device according to claim 26, wherein the storage device is a battery.

28. The storage device according to claim 27, wherein said battery is a lithium-ion battery.

29. The storage device according to claim 28, wherein the storage device is a lithium-ion accumulator.

30. The storage device according to claim 29, wherein said battery includes a non-aqueous electrolyte.

31. The storage device according to claim 30, wherein said non-aqueous electrolyte is a carbonate.

32. The storage device according to claim 31, wherein said carbonate is a carbonate mixture with a conducting salt.

33. The storage device according to claim 32, wherein said carbonate mixture includes ethylene-carbonate and dimethyl-carbonate.

34. The storage device according to claim 33, wherein said carbonate mixture with said conducting salt is LiPF₆.

35. The storage device according to claim 34, further comprising a housing accommodating said feed-through.

36. The storage device according to claim 35, wherein said housing is a battery housing.

37. The storage device according to claim 35, wherein said base body is one of a metal, a high-grade steel, stainless steel and a light metal.

38. The storage device according to claim 37, wherein said base body is one of aluminum, aluminum silicon carbide (AlSiC), an aluminum alloy, magnesium, a magnesium alloy, titanium and a titanium alloy.

39. The storage device according to claim 35, wherein said housing includes one of a metal, a high-grade steel, stainless steel and a light metal.

40. The storage device according to claim 39, wherein said housing includes one of aluminum, AlSiC, an aluminum alloy, magnesium, a magnesium alloy, titanium and a titanium alloy.

41. A method of utilizing a glass composition, the method comprising:
providing a battery including a non-aqueous electrolyte; and
using said glass composition to insert a conductor into a housing of a battery, said glass composition including:

| | |
|---|---|
| $P_2O_5$ | 35-50 mol-%; |
| $Al_2O_3$ | 0-14 mol-%; |
| $B_2O_3$ | 2-10 mol-%; |
| $Na_2O$ | 0-30 mol-%; |
| $M_2O$ | 0-20 mol-%, wherein M is one of K, Cs and Rb; |
| PbO | 0-10 mol-%; |
| $Li_2O$ | 0-35 mol-%; |
| BaO | 0-20 mol-%; and |
| $Bi_2O_3$ | 0-10 mol-%, | wherein said glass composition is free of lead except for contaminants.

42. The method according to claim 41, wherein said glass composition includes:

| | |
|---|---|
| $P_2O_5$ | 39-48 mol-%; |
| $Al_2O_3$ | 2-12 mol-%; |
| $B_2O_3$ | 4-8 mol-%; |
| $Na_2O$ | 0-20 mol-%; |
| $M_2O$ | 12-20 mol-%; |
| PbO | 0-9 mol-%; |
| $Li_2O$ | 0-35 mol-%; |
| BaO | 0-20 mol-%; and |
| $Bi_2O_3$ | 1-5 mol-%. |

43. The method according to claim 42, wherein said glass composition includes:

| | |
|---|---|
| $Li_2O$ | 17-35 mol-%; |
| BaO | 0-20 mol-%; and |
| $Bi_2O_3$ | 2-5 mol-%. |

44. The method according to claim 41, wherein said battery is a lithium-ion battery.

45. The method according to claim 41, wherein said battery is a lithium-ion accumulator.

46. The method according to claim 42, wherein said non-aqueous electrolyte is a carbonate.

47. The method according to claim 46, wherein said carbonate is a carbonate mixture with a conducting salt.

48. The method according to claim 47, wherein said carbonate mixture with a conducting salt includes $LiPF_6$.

49. The method according to claim 41, wherein said glass composition includes:

| | |
|---|---|
| $P_2O_5$ | 38-50 mol-%; |
| $Al_2O_3$ | 3-14 mol-%; |
| $B_2O_3$ | 4-10 mol-%; |
| $Na_2O$ | 10-30 mol-%; and |
| $K_2O$ | 10-20 mol-%. |

50. The method according to claim 49, wherein said glass composition includes:

| | |
|---|---|
| $P_2O_5$ | 39-48 mol-%; |
| $Al_2O_3$ | 4-12 mol-%; |
| $B_2O_3$ | 5-8 mol-%; |
| $Na_2O$ | 14-20 mol-%; and |
| $K_2O$ | 12-19 mol-%. |

51. The method according to claim 50, wherein the conductor includes one metal.

52. The method according to claim 51, wherein said one metal is one of aluminum, AlSiC, copper, CuSiC, magnesium, silver, gold, an aluminum alloy, a magnesium alloy, a copper alloy, a silver alloy, a gold alloy and a NiFe alloy.

53. The method according to claim 52, wherein said base body includes one of a light metal, a high-grade steel, steel and stainless steel.

54. The method according to claim 53, wherein said base body includes one of aluminum, AlSiC, an aluminum alloy, magnesium, a magnesium alloy, titanium, and a titanium alloy.

* * * * *